May 20, 1952 J. M. DIETRICH 2,597,076
HARVESTING MACHINE
Filed Oct. 26, 1949 3 Sheets-Sheet 1

James M. Dietrich
INVENTOR.
BY Beale and Jones
ATTORNEYS

May 20, 1952     J. M. DIETRICH     2,597,076
HARVESTING MACHINE
Filed Oct. 26, 1949     3 Sheets-Sheet 2
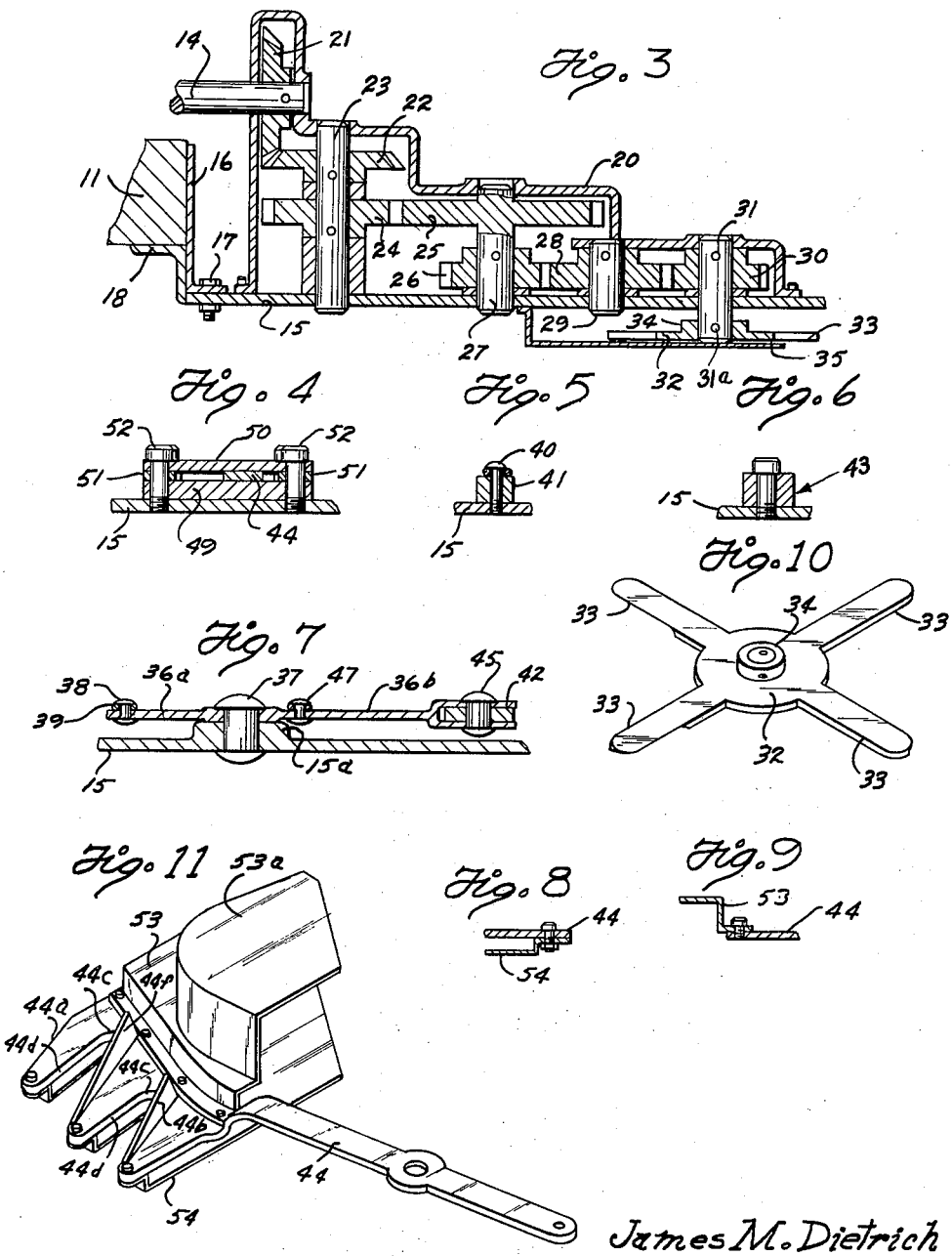

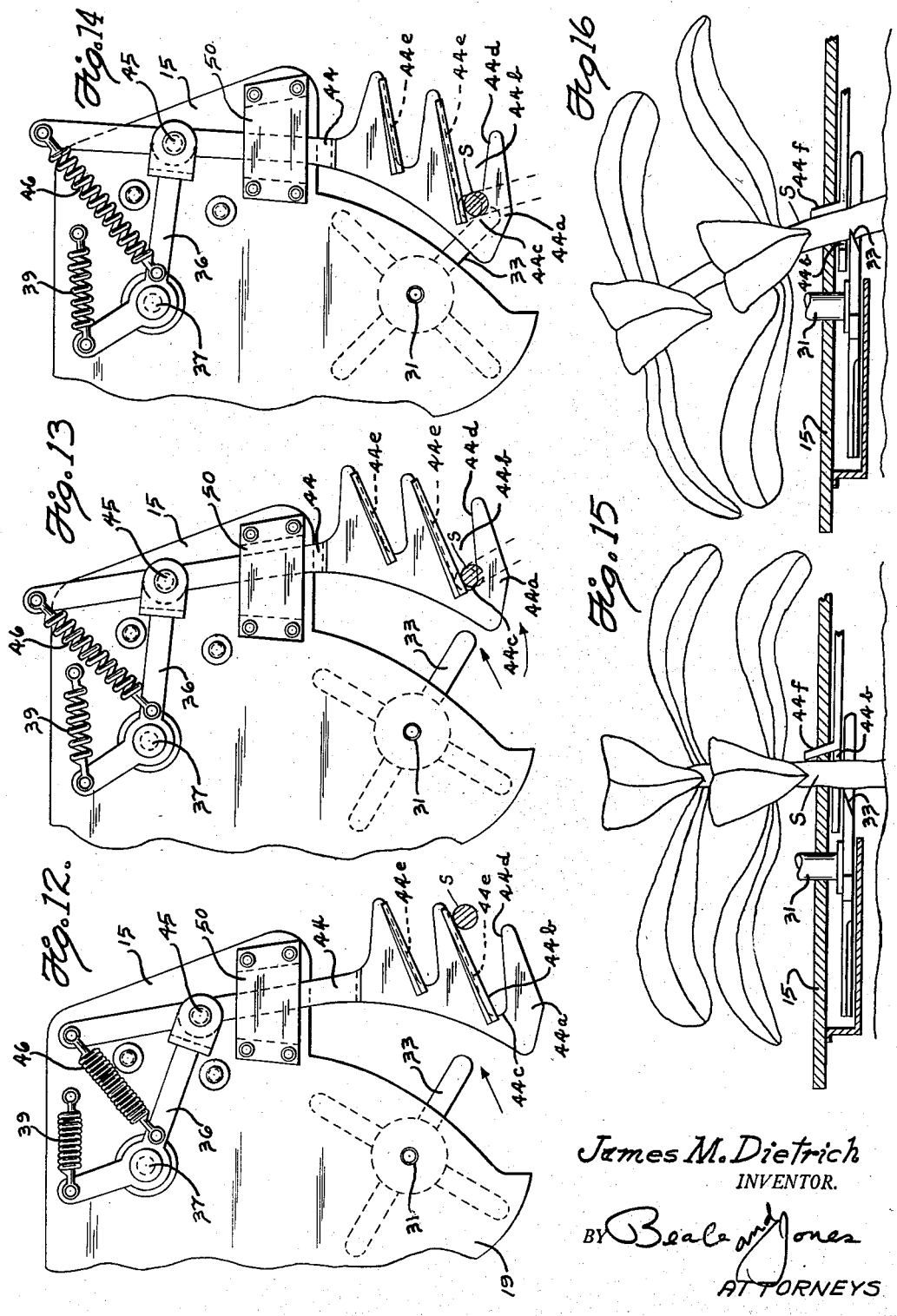

UNITED STATES PATENT OFFICE 2,597,076

HARVESTING MACHINE

James M. Dietrich, Lititz, Pa.

Application October 26, 1949, Serial No. 123,718

9 Claims. (Cl. 56—27.5)

This invention relates to harvesting machines and more particularly to a machine for cutting tobacco stalks in harvesting tobacco crops.

It has always been a difficult and expensive undertaking to produce tobacco for the market owing to the great care which must be exercised in handling the plants to avoid damaging the leaf. In harvesting tobacco, particularly, it has been common practice to cut down the tobacco stalk in the field with hand shears. This method is time consuming and requires utilization of a large amount of labor thus greatly increasing the cost of production. Attempts have been made to develop machines for cutting down tobacco stalks in the field but these machines have been incapable of harvesting tobacco without bruising or tearing the leaves of the tobacco plant.

The foregoing objections have been overcome by this invention which, briefly stated, comprises a harvesting machine which includes a wheel supported tractor the width of which is such that the tractor may be guided between the rows of tobacco plants without causing damage thereto. A power unit is mounted on the bed of the tractor which may, if desired, be connected to the wheels of the implement in order to drive the machine. A horizontal platform is mounted on the bed in front of the tractor immediately above the ground, which platform is provided with a laterally extending offset portion adapted to project over an adjacent row of tobacco plants near the base of the plant and below the leaves on the stalk of the plant. A horizontally disposed rotary cutting member which is positively driven by the power unit on the tractor bed is mounted on the laterally extending offset portion of the platform below the lowermost face thereof. A horizontally disposed arm having a plurality of slots formed therein is mounted on the platform with the slotted portion thereof positioned in front of and slightly ahead of the leading edge of the laterally extending offset portion of the platform. The edges of the arm adjacent the slots are provided with inclined flange portions which are canted toward the outer extremity of the offset portion of the platform. The mounting for the arm on the platform is such that the arm may pivot about a point, thus allowing the slotted end of the arm to follow an arcuate path; and, as well, the arm is arranged to move transversely over the platform. The pivotal and transverse movements of the slotted arm are accomplished by overcoming the biasing action of two spring members. The harvester may, therefore, be moved between rows of tobacco plants with the offset portion of the platform and the slotted end of the arm overhanging a row of plants. As the harvester approaches a plant the stalk enters one of the slots in the arm and engages the inclined flange portion at the edge thereof which bends the stalk so that the leaves on the stalk do not come into contact with any mechanism on the platform. As the harvester advances, the stalk exerts a pressure which overcomes the pressure of the spring member biasing the arm transversely, thus causing the arm to traverse the platform. When the stalk reaches the end of the slot, it then exerts a pressure which overcomes the pressure of the spring member biasing the arm about its pivot point, thus causing the arm to swing on the pivot. As this action continues, the stalk encounters the rotary cutting member which severs the portion of the stalk bearing the leaves from the base thereof. The arm, upon being freed, is returned to its original position by the action of the spring members. The result of this last action is to project the severed stalk to one side and slightly ahead of the offset portion of the platform. This displacement of the severed stalk is accomplished gently with the result that the leaves on the stalk are not injured.

It is, therefore, an object of this invention to provide a harvester for cutting tobacco stalks in the field which will sever the leafed portion of the stalk without coming into contact with the leaves and causing damage thereto.

Another object of this invention is to provide a harvester for cutting tobacco stalks in the field which will sever the leafed portion of the stalk and project this portion to a point outside of the path of the harvester without damaging the tobacco leaves.

Still another object of this invention is to provide a tobacco cutting machine which will bend the stalk of the tobacco plant immediately prior to severing the stalk to displace the leaves and prevent them from coming into contact with any portion of the cutting machine.

A further object of this invention is to provide a harvester for cutting tobacco stalks in the field that includes a wheel supported bed having a platform mounted on the front thereof which is provided with a laterally extending offset portion for supporting a cutting member in the path of a row of tobacco plants as the harvester passes between the rows of plants.

A still further object of this invention is to provide a tobacco cutting machine having a platform mounted on the front thereof with an offset portion for supporting a cutting member and an arm mounted on the platform ahead of the offset portion of the platform, the arm being provided with slots having inclined flange portions disposed at the edges thereof for bending the stalks of the tobacco plant and preventing the leaves of the plant from coming into contact with the machine.

It is also an object of this invention to provide a tobacco cutting machine having a platform mounted on the front thereof with an offset portion for supporting a cutting member and an arm mounted on the platform ahead of the offset portion, the arm being adapted to move transversely over the platform and thus be displaced laterally; and, as well, to pivot and permit the extremity of the arm to follow an arcuate path.

Other objects are provided by details of the harvester including upper and lower guard members for the slotted stalk-engaging arm; a novel pivotally mounted lever for supporting the slotted arm; spring members for biasing slotted arm and the arm supporting lever; and stop members for limiting the movement of both the slotted arm and the arm supporting lever.

Further objects will be apparent from the following description of the invention and the accompanying drawings, in which:

Figure 3 is an enlarged side elevational view of a portion of the tobacco cutting machine in cross-section taken along the line 3—3 of Figure 2, showing one form of power transmitting means for driving the cutting machine;

Figure 4 is an enlarged side elevational view of a combined supporting bearing and stop for the slotted arm in cross-section taken along the line 4—4 of Figure 2;

Figure 5 is an enlarged side elevational view of a spring anchoring member in cross-section taken along line 5—5 of Figure 2;

Figure 6 is an enlarged side elevational view of one of a pair of stops for limiting the movement of the slotted-arm supporting lever in cross-section taken along lines 6—6 of Figure 2;

Figure 7 is an enlarged side elevational view of the slotted-arm supporting lever in cross-section taken along line 7—7 of Figure 2;

Figure 8 is an enlarged side elevational view of a portion of the leading edge of the slotted stalk engaging arm in cross-section taken along line 8—8 of Figure 2;

Figure 9 is an enlarged side elevational view of a portion of the trailing edge of the slotted stalk engaging arm in cross-section taken along line 9—9 of Figure 2;

Figure 10 is an enlarged perspective view of the cutter member removed from the tobacco cutting machine;

Figure 11 is an enlarged perspective view of the slotted stalk engaging arm removed from the tobacco cutting machine and showing the upper and lower guards attached thereto;

Figures 12, 13 and 14, are enlarged top plan views of a portion of the platform of the cutting machine and may be considered together to observe the several positions of the slotted arm during the operation of the harvester; and Figures 15 and 16 are enlarged schematic showings of the leading edge of the platform of the tobacco cutting machine showing in elevation the position of the tobacco plant as it is about to enter a slot in the arm member and the position of the stalk as it reaches the end of the slot in the arm.

Figure 1:
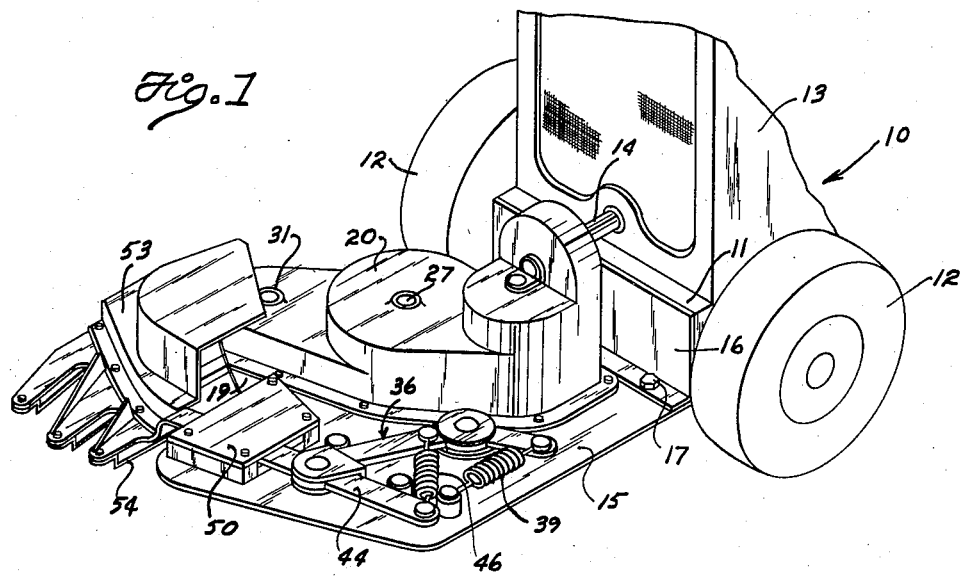
Figure 1 is a perspective view of a preferred embodiment of the tobacco cutting machine comprising the invention and shows a portion of the tractor for supporting the cutting machine.
Figure 2:
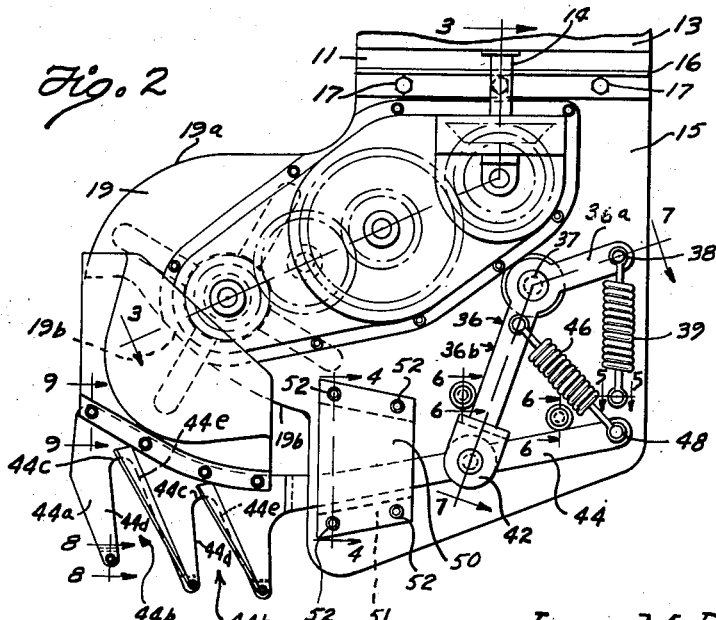
Figure 2 is an enlarged top plan view of the tobacco cutting machine shown in Figure 1, showing only a portion, however, of the tractor support therefor.

Referring to the foregoing figures and more particularly to Figure 1 and Figure 2, the tobacco harvesting machine comprising this invention is mounted on a tractor or other wheeled vehicle provided with a power supply unit, generally indicated as 10 which consists of a bed 11 supported by two or more wheels 12. A power supply unit 13 of conventional form is mounted on the bed 11. The power supply unit 13 is provided with a power take-off shaft 14.

The cutting machine comprises a horizontally disposed platform 15 which is supported in front of the tractor 10, just above the surface of the ground. The platform 15 is attached to the bed 11 by a flanged plate 16 which is secured to the bed 11 in any well known conventional manner and connected to the platform 15 by bolts 17. An angle member 18 positioned beneath the bed 11 provides added reinforcement for the connection between the flanged plate 16 and the platform 15, though this angle member may be formed as an integral part of the platform 15, if desired. The horizontally disposed platform 15 is provided with a laterally extending offset portion 19 which is adapted to extend to one side of the path of movement of the tractor 10.

The platform 15 and the offset portion 19 are preferably formed in one piece from a strong metal plate which serves as a base or support for the elements of the harvesting machine hereinafter described. The platform 15 is generally rectangular in shape with the longitudinal axis thereof extending forwardly from the tractor 10. The transverse axis of the platform 15 is made sufficiently narrow that the edges of the platform do not extend beyond the sides of the tractor, thus permitting the harvesting machine to be driven between the rows of the tobacco plants. The offset portion 19 may be formed in any desired planar shape provided, however, that this portion overhangs and covers a major portion of the cutting member, leaving only enough of this cutting member exposed so as to sever the stalks of the tobacco plants. The offset portion 19 is shown in Figure 2 as including a plate terminating in a rear edge 19a which overhangs the cutting member and a sharp rearwardly extending curved edge 19b which leaves a portion of the cutting member exposed. The offset portion 19 extends beyond the edge of the platform 15 a distance sufficient to permit this member to overhang the tobacco plants in a row adjacent which the tractor is driven.

The power take-off shaft 14 extends into a housing 20 mounted on the platform 15 and the extension 19 thereof. A power transmitting system is enclosed within the housing and a preferred form is shown in Figure 3. This includes a bevel gear 21 secured to the shaft 14 which drives a bevel gear 22 mounted on a shaft 23 which extends vertically from an aperture provided in the platform 15. A spur gear 24 also mounted on the shaft 23 drives the spur gears 25 and 26 mounted on the shaft 27 which shaft also extends vertically from an aperture provided in the platform 15. The gear 26 drives, in turn, the spur gear 28 on shaft 29 mounted in the offset portion 19, and the spur gear 30 mounted on the shaft 31. The shaft 31 extends downwardly through an aperture formed in the offset portion 19 and a rotary cutting member is mounted on the lowermost end thereof. The rotary cutting member is shown in detail in Figure 10 and consists of a circular plate 32 having a plurality of cutting blades 33 extending radially therefrom. The rotary cutting member rotates in the direction of the arrow 32a as is shown in Figure 2 of the drawings. An apertured collar 34 on the plate 32 receives the shaft 31 and is secured thereto by a pin 31a. The rotary cutting member is, therefore, located below the lowermost face of the offset portion 19 with the blades 33 horizontally disposed above the ground. A guard plate 35 secured to the lowermost face of the offset portion 19 protects the blades 33 and prevents them from coming into contact with the ground. The power supply unit 13 drives the rotary cutting member through the train of gears described. Any other suitable power transmitting system may be employed in lieu of that shown; such as, for example, belt and pulley or chain drive systems.

A bell crank lever 36 composed of a small arm 36a and a larger arm 36b is mounted at the apex of the angle formed by the arms on a doubleheaded pin 37 which extends upwardly from an aperture provided in the platform 15. The bell crank lever 36 may pivot about the pin 37 above the uppermost face of the platform 15 as is shown in Figure 7. The lever rests on a bearing 15a which is formed in the platform. The small arm 36a of the lever is connected by a pin 38 extending through an aperture formed in the arm to a coil spring member 39 which is, in turn, anchored to the platform 15 by a pin 40 provided with a spacing collar 41 as is shown in Figure 5 upon which the terminal end of the spring 39 rests. The coil spring 39 biases the lever 36 in a clockwise direction as viewed in Figure 2. The larger arm 36b of the bell crank lever 36 has a bifurcated portion 42 formed in the end thereof which is apertured. A pair of stops 43—43 shown in Figure 6 are disposed on opposite sides of the arm 36b to limit the movement of the bell crank lever 36.

An arm 44 which is shown in detail in Figure 11 is pivotally mounted in the bifurcated portion 42 of the bell crank lever 36, these two members being relatively movable on a pin 45 which extends through apertures formed in the portion 42 and a corresponding aperture provided in the arm 44. The lever 36 and the arm 44 are further connected by a coil spring member 46 one terminal of which engages the pin 47 on the arm 36b of the lever 36 and the other terminal end of which engages the pin 48 on one end of the arm 44. The coil spring biases the arm 44 in a counterclockwise direction about the pivot pin 45 as viewed in Figure 2. The arm 44 extends through and is supported by a combined stop and bearing assembly shown in detail in Figure 4. This assembly includes a bearing plate 49 and an upper plate 50 which are spaced by bars 51—51. The assembly is secured to the uppermost face of the platform 15 by a plurality of threaded pins 52 which engage the platform 15.

The outermost end of the arm 44 which is remote from the pivot pin 45 and the end of the arm to which the coil spring 46 is secured has a forwardly projecting portion 44a formed thereon which end of the arm is located in front of the offset portion 19. A plurality of triangular slots 44b are formed therein which extend, at their widest point from the leading edge of the projecting portion 44a rearwardly and terminate in rounded ends 44c. The edge 44d of each slot near the free end of the arm 44 is parallel or very nearly parallel to the path of travel of the tractor. The edges 44e of the slots extend angularly toward the longitudinal axis of the platform 15 as shown in dotted lines in Figure 2. An inclined flange 44f is secured to the arm 44 adjacent and along each edge 44e of the slots. The flanges 44f are of triangular shape with their apices terminating at the leading edge of the projection 44a of the arm 44. The inclined vertical face of each flange 44f overhanging or extending over the corresponding slot, therefore, gradually increases in height and the highest point is located slightly to the rear of the rounded ends 44c. An upper guard member 53 having an upwardly extending offset portion 53a permitting it to clear the adjacent portion of the housing 20, is secured by bolts to the uppermost face of the slotted arm 44 along the trailing edge thereof. A lower guard 54 is secured by bolts to the lowermost face of the slotted arm 44 and is adapted to move below and over the lowermost face of the guard 35.

The operation of the tobacco harvesting machine may be most clearly observed by reference to Figures 12 to 16 inclusive. The tractor 10 is driven by the operator between parallel rows of tobacco plants with the laterally extending offset portion 19 of the platform 15 and the depending rotary cutter member mounted thereon extending into a row of tobacco plants. As the harvester approaches a plant, the base of the stalks thereof enters one of the triangular slots 44b in the projecting portion 44a of the arm 44 as is shown in Figures 12 and 15. The base of the stalks of the plant is engaged by the edge 44e of the slot and the leading end of the inclined flange 44f. As the tractor continues to move forward the rounded end 44c of the slot approaches the stalks. Two separate actions take place during this movement of the harvester. The first action is that of the inclined flange 44f in which the inclined lateral face thereof in contact with the base of the stalks bends the plant to the position shown in Figure 16. The stalks of the tobacco plant are thus tilted away from the platform 15 and the lower leaves on the stalks cannot, therefore, come into contact with the elements of the harvester mounted on the platform 15 which support the slotted arm 44. It is impossible for the leaves of the plant to be bruised or damaged by the arm 44, the bell crank lever 36 and the associated spring members and stops which protection is an important feature of this invention.

The second action referred to above results from the pressure exerted by the stalks on the arm 44 longitudinally thereof. This pressure overcomes the biasing pressure of the coil spring 39 on the bell crank lever 36 and as the pressure of the plant stalks continues to be exerted, the lever 36 pivots about the pivot pin 37 thus permitting the slotted arm 44 to move transversely over the surface of the platform 15 as is shown in Figure 13. When the tractor 10 advances to a point at which the round end 44c of the slot 44b is engaged by the base of the stalks as is shown in Figure 13, the pressure exerted by the stalks as the tractor continues to move forward overcomes the biasing action of the coil spring 46; and, as this pressure continues to be exerted, the slotted arm 44 swings about its pivot pin 45. The arm 44 thereupon moves along an arcuate path toward the leading edge 19b from below which the cutting blades 33 of the rotary cutting member project. The plant stalks are severed from the base thereof by the cutting blades 33 and the leaf-bearing portion of the stalks is freed.

After the leafed portion of the stalk has been severed from the base thereof, as described above, the forces exerted by the stalks on both the rounded end 44c and the angularly extending edge 44e of the slot are removed. The coil springs 39 and 46 instantaneously exert biasing actions on the bell crank lever 36 and the slotted arm 44, respectively. The lever 36 swings on its pivot pin 37 in a clockwise direction as viewed in Figure 2 and the slotted arm 44 mounted on the large arm 36b of the lever 36 is moved transversely over the platform 15 to its original position. Simultaneously, the coil spring 46 causes the slotted arm 44 to pivot back to its original position about the pin 45 in a counter-clockwise direction as viewed in Figure 2. The combined transverse and rotary movements of the slotted arm 44 cause it to project the severed leafed portion of the stalks to the side and slightly ahead of the tractor 10 and clear of the laterally extending offset portion 19 of the platform 15. The harvested tobacco plant is thus gently deposited in a path adjacent the row of plants being harvested remote from the path of the tractor without cutting, tearing, bruising, or otherwise damaging the leaves of the plant.

It will be apparent from the foregoing description of this invention that a very novel harvesting machine for cutting tobacco plants in the field has been provided. In the machine described, the moving parts of the machine which are dangerous to persons working with and around the machine; such as, for example, the power transmitting system and the rotary cutting member are covered. The cutting member is, furthermore, protected from the ground by both a fixed guard 35 and the swinging guard 54 mounted on the slotted end of the arm 44. The transverse movement of the slotted arm 44 over the surface of the platform 15 is limited by the stops 43—43 which prevent any portion of the assembly at the slotted end of the arm 44 from coming into contact with the rotary cutting member. The slotted arm 44 is also well supported on a broad bearing plate 49 and the bars 51—51 at the front and rear of the bearing plate 49 limit the pivotal movement of the slotted arm 44 about the pin 45.

The harvesting machine has been described as being especially useful in cutting tobacco plants in the field. A harvesting machine embodying the principles of this invention may, obviously, be used to harvest any crop planted in rows that has stalks, the upper portions of which are of a nature that makes it advantageous to harvest the crop without handling this upper portion. The size of the slots 44b in the arm 44 and the amount of transverse and rotary movement of this arm may be varied to accommodate the particular crop it is desired to harvest.

I claim:

1. In a harvesting machine including a tractor comprising a bed, ground engaging wheels supporting said bed and a power supply means mounted on said bed; the improvement which comprises an elongated horizontal supporting member mounted on said bed and projecting forwardly of said tractor above the ground, said tractor and supporting member being adapted for movement between rows of plants to be harvested, said supporting member being provided with a horizontal offset portion projecting beyond one side of said tractor and being adapted to extend into the path of one of said rows of plants, a cutting member mounted on said offset portion and extending forwardly thereof, power transmitting means mounted on said supporting member and the offset portion thereof for transmitting power from said supply means to said cutting member, an arm mounted on said horizontal supporting member and extending transversely therefrom to occupy a position in front of said offset portion, the extending portion of said arm being provided with a plurality of angularly disposed slots extending inwardly of said arm from the leading edge thereof, and a plurality of inclined flanges mounted on the extending portion of said arm, one each of said flanges extending upwardly from said arm along the edge of each slot nearest said horizontal supporting member and being inclined toward the end of said arm remote from said horizontal supporting member.

2. In a harvesting machine an elongated horizontal supporting member, said horizontal supporting member being provided with a horizontal offset portion projecting to one side thereof and being adapted to extend into the path of a row of plants, a cutting member mounted on said offset portion and extending forwardly thereof, power transmitting means mounted on said supporting member and the offset portion thereof for transmitting power to said cutting member, a horizontal lever pivotally mounted on said supporting member, a spring means for biasing said lever toward said offset portion, an arm pivotally mounted on said lever and extending transversely of said supporting member to occupy a position in front of said offset portion, the extending portion of said arm being provided with a plurality of angularly disposed slots extending inwardly of said arm from the leading edge thereof and spring means for biasing said arm away from said offset portion, said arm being adapted for movement transversely of the surface of said supporting member and pivotally toward said offset portion in response to pressure exerted by the stalk of a plant engaged by the slotted porion of said arm.

3. A harvesting machine as set forth in claim 2 characterized in that said lever consists of a bell crank lever including a small arm and a large arm, said lever being pivotally mounted on said supporting member at the apex of the angle formed by said arms, said first named spring means being connected to said small arm and anchored to said supporting member, said slotted arm being pivotally mounted on said large arm of said lever adjacent the end thereof, and said second named spring means interconnecting the large arm of said lever and said slotted arm.

4. A harvesting machine as set forth in claim 2 characterized in that said cutting member includes a horizontally disposed rotatable plate and a plurality of cutting blades extending therefrom, said rotary plate and cutting blades being supported below the lowermost face of said offset portion.

5. A harvesting machine as set forth in claim 2 characterized in that a plurality of inclined flanges are mounted on the extending portion of said arm, one each of said flanges extending upwardly from said arm along the edge of each slot nearest said horizontal supporting member and being inclined toward the end of said arm remote from said supporting member.

6. A harvesting machine as set forth in claim 2 characterized in that each of said angularly disposed slots formed in said arm includes an edge remote from said supporting member which is nearly parallel to the longitudinal axis of said member and an edge adjacent said member extending at an angle toward the longitudinal axis thereof, said edges of each slot terminating in a rounded end.

7. A harvesting machine as set forth in claim 2 characterized in that the portion of said arm disposed in front of said offset portion consists of a plate member projecting forwardly from said offset portion and having triangular slots formed therein with the largest portion of each slot located at the entrance of the slot at the leading edge of said plate member.

8. A harvesting machine as set forth in claim 2 characterized in that stop members are mounted on said horizontal supporting member on opposite sides of said lever and a bearing member for said slotted arm is mounted on said supporting member.

9. In a harvesting device, a platform member having a leading edge adapted to be mounted on a wheel supported vehicle, a cutting member mounted on said platform member and extending forwardly of said leading edge thereof, means for driving said cutting member, a plant engaging arm positioned transversely of said platform member with one portion thereof positioned to one side of said cutting member and another portion having a leading edge arranged in advance of said cutting member, said latter portion being provided with a plurality of slots extending inwardly of said arm from said leading edge thereof, each slot having a side edge extending rearwardly from said leading edge and at an angle outwardly toward the end of the portion of said plant engaging arm arranged in advance of said cutting member, and means for pivotally connecting the portion of said arm positioned to one side of said cutting member to said platform member in a manner to yieldably permit said plant engaging arm to move bodily transversely of said platform member and simultaneously swing rearwardly toward said cutting member, said transverse and swinging movements being in response to pressure exerted by a plant stalk on said angularly extending side edge.

JAMES M. DIETRICH.

REFERENCES CITED

The following references are of record in the file of this patent:

UNITED STATES PATENTS

| Number | Name | Date |
| --- | --- | --- |
| 871,203 | Burhop | Nov. 19, 1907 |
| 1,831,658 | Groenig et al. | Nov. 10, 1931 |
| 1,891,526 | Dupuis | Dec. 20, 1932 |